(12) United States Patent
Budd et al.

(10) Patent No.: US 8,011,563 B2
(45) Date of Patent: Sep. 6, 2011

(54) COMPLIANT MOLD FILL HEAD WITH INTEGRATED CAVITY VENTING AND SOLDER COOLING

(75) Inventors: Russell A. Budd, North Salem, NY (US); Evan G. Colgan, Chestnut Ridge, NY (US); Peter A. Gruber, Mohegan Lake, NY (US); Gareth G. Hougham, Ossining, NY (US); John P. Karidis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 11/696,753

(22) Filed: Apr. 5, 2007

(65) Prior Publication Data

US 2008/0245847 A1 Oct. 9, 2008

(30) Foreign Application Priority Data

Apr. 5, 2006 (JP) ................................ 2006-104267
Apr. 5, 2006 (JP) ................................ 2006-104268

(51) Int. Cl.
*B23K 31/02* (2006.01)
*B23K 37/00* (2006.01)
(52) U.S. Cl. ............. 228/256; 228/33; 228/46; 228/200
(58) Field of Classification Search .................. None
See application file for complete search history.

(56) References Cited

U.S. PATENT DOCUMENTS

| | | | | |
|---|---|---|---|---|
| 2,296,435 A * | 9/1942 | Giard | | 92/91 |
| 3,059,604 A * | 10/1962 | Brandys | | 228/37 |
| 3,821,614 A * | 6/1974 | Schmidt | | 257/693 |
| 4,622,239 A * | 11/1986 | Schoenthaler et al. | | 427/8 |
| 4,720,402 A * | 1/1988 | Wojcik | | 427/98.4 |
| 5,878,939 A * | 3/1999 | Luchinger et al. | | 228/33 |
| 5,925,414 A * | 7/1999 | Buechele et al. | | 427/97.8 |
| 6,171,399 B1 * | 1/2001 | Kaiser et al. | | 118/406 |
| 6,231,333 B1 * | 5/2001 | Gruber et al. | | 425/546 |
| 6,286,422 B1 * | 9/2001 | Lin et al. | | 101/123 |
| 6,495,199 B1 * | 12/2002 | Kaiser et al. | | 427/98.5 |
| 6,527,158 B1 * | 3/2003 | Brouillette et al. | | 228/33 |
| 7,504,604 B2 * | 3/2009 | Rossopoulos et al. | | 219/121.66 |
| 7,513,410 B2 * | 4/2009 | Biggs et al. | | 228/256 |
| 7,632,750 B2 * | 12/2009 | Lee et al. | | 438/612 |
| 2003/0168006 A1 * | 9/2003 | Williams | | 118/300 |
| 2006/0183270 A1 * | 8/2006 | Humpston | | 438/106 |
| 2007/0246853 A1 * | 10/2007 | Chey et al. | | 264/104 |
| 2008/0014406 A1 * | 1/2008 | Chey et al. | | 428/131 |
| 2008/0048008 A1 * | 2/2008 | Schultz | | 228/180.22 |
| 2008/0179035 A1 * | 7/2008 | Gruber et al. | | 164/113 |
| 2008/0302502 A1 * | 12/2008 | Cordes et al. | | 164/303 |
| 2009/0008057 A1 * | 1/2009 | Cordes et al. | | 164/151.4 |
| 2009/0014146 A1 * | 1/2009 | Budd et al. | | 164/271 |
| 2009/0037016 A1 * | 2/2009 | Chainer et al. | | 700/146 |
| 2009/0183849 A1 * | 7/2009 | Budd et al. | | 164/61 |
| 2009/0301685 A1 * | 12/2009 | Gruber et al. | | 164/303 |

* cited by examiner

*Primary Examiner* — Kiley Stoner
(74) *Attorney, Agent, or Firm* — Ryan, Mason & Lewis, LLP (57) ABSTRACT

A mold fill head includes a solder delivery head and an interface portion having a compliant portion secured to the solder delivery head and a dispensing region associated with the compliant portion. The dispensing region is formed with at least one aperture configured to interface with cavities in a mold plate, the at least one aperture being in fluid communication with the solder delivery head. The compliant portion is configured and dimensioned to urge the dispensing region against the mold plate when held a predetermined distance therefrom and to substantially tolerate variations in flatness of the mold plate, variations in the predetermined distance, and/or variations in an angular orientation of the interface portion and the mold plate.

22 Claims, 10 Drawing Sheets

COMPLIANT MOLD FILL HEAD WITH INTEGRATED CAVITY VENTING AND SOLDER COOLING

FIELD OF THE INVENTION

The present invention generally relates to the electrical and electronic arts and, more particularly, to fabrication and packaging of integrated circuits.

BACKGROUND OF THE INVENTION

The bumping of silicon chips using a process known as C4NP (Controlled Collapse Chip Connection—New Process) requires filling of the C4NP mold plate in a reliable, high speed and cost-effective manner; this poses quite a challenge. While the C4NP process has the potential to revolutionize the wafer bumping industry, by enabling the bumping of many lead free solders in a speedy and low cost fashion as compared with prior methods such as electro-plating, the benefits of the C4NP process may not be fully realized unless it is possible to quickly and effectively dispense solder into mold plate micro cavities In addition, certain prior art techniques employ polymer O-rings that cannot be used with very high temperature "high lead" solders.

Accordingly, it would be desirable to overcome the limitations of prior art approaches.

SUMMARY OF THE INVENTION

Principles of the present invention provide techniques for filling cavities in a mold plate. An exemplary embodiment of a mold fill head for filling cavities in a mold plate includes a solder delivery head and an interface portion. The interface portion includes a compliant portion secured to the solder delivery head and a dispensing region associated with the compliant portion The dispensing region is formed with at least one aperture configured to interface with the cavities in the mold plate, the at least one aperture being in fluid communication with the solder delivery head. The compliant portion is configured and dimensioned to urge the dispensing region against the mold plate when held a predetermined distance therefrom and to substantially tolerate variations in flatness of the mold plate, variations in the predetermined distance, and/or variations in an angular orientation of the interface portion and the mold plate. The invention also contemplates the combination of a mold plate having a plurality of cavities with a mold fill head of the kind just described.

In another aspect, a method for filling cavities in a mold plate includes the steps of providing a mold fill head of the kind described, causing the mold fill head to be substantially a predetermined distance from the mold plate with the at least one aperture in fluid communication with at least one of the cavities, and flowing solder from the solder delivery head, through the at least one aperture, into the at least one of the cavities.

In one or more embodiments, solder is precisely dispensed in the mold plate using a flexible and compliant mold fill head that incorporates features to enhance fill speed and reliability. One or more inventive embodiments improve fill speed by incorporating one or more of micro-channel venting, vacuum assisted cavity venting, and gas-assisted solder cooling. In addition, one or more inventive embodiments ensure the fill head maintains a proper relationship with the mold plate by incorporating compliant "bellows" features that insure proper contact of the solder deliver head with the mold plate across its entire surface. Further, one or more inventive embodiments eliminate the polymer o-rings used in the prior art, enabling the fill head to be used with very high temperature "high lead" solders.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
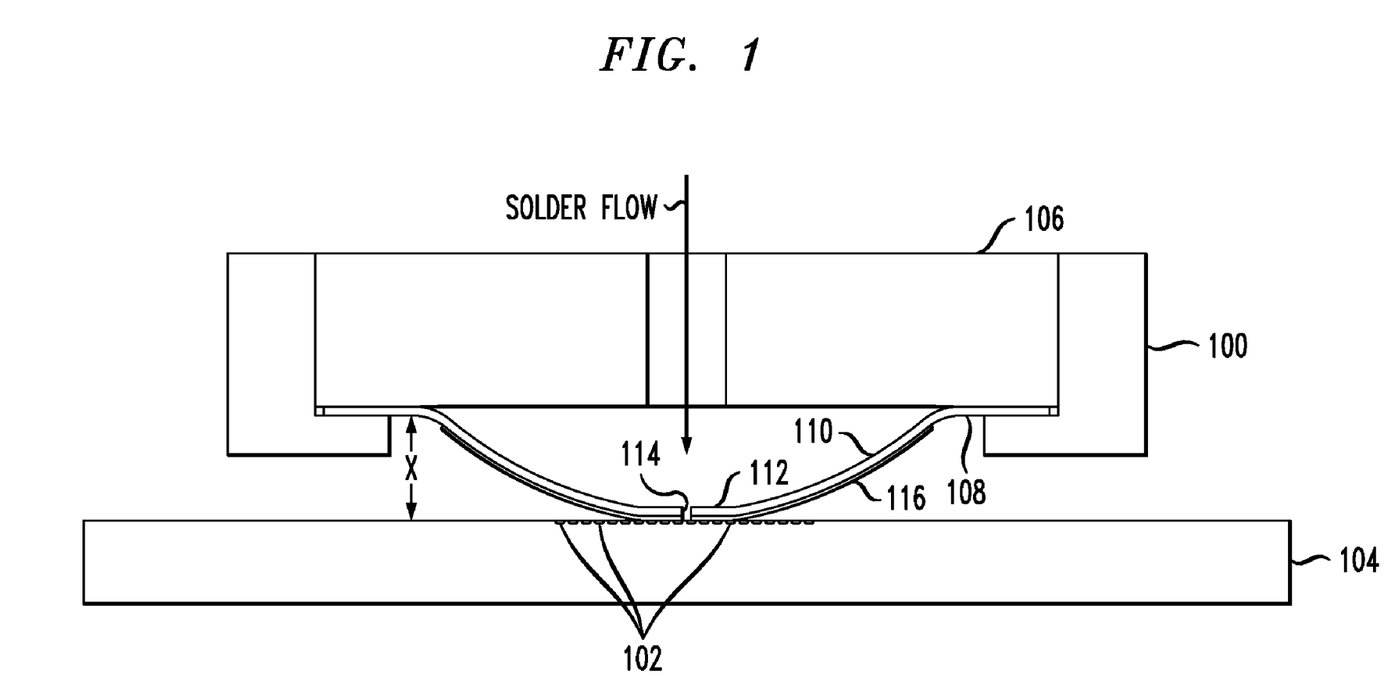
FIG. 1 is a cross-sectional view of an exemplary embodiment of a solder fill head, according to an aspect of the invention, that incorporates a compliant membrane in contact and an outer bearing layer that contacts the mold plate.

Exemplary apparatuses and methods will now be described with respect to the figures, in which like reference characters are used throughout to refer to like elements, unless otherwise noted. With reference to FIG. 1, an exemplary embodiment of a mold fill head 100 for filling cavities 102 in a mold plate is depicted therein. The mold fill head 100 includes a solder delivery head 106 and an interface portion 108. The interface portion 108 in turn includes a compliant portion 110 secured to the solder delivery head 106 and a dispensing region 112 associated with the compliant portion 110 and formed with at least one aperture 114 configured to interface with the cavities 102 in the mold plate 104. The at least one aperture 114 is in fluid communication with the solder delivery head 106, as indicated by the arrow labeled "solder flow."

The compliant portion 110 is configured and dimensioned to urge the dispensing region 112 against the mold plate 104 when held a predetermined distance therefrom and to substantially tolerate variations in flatness of the mold plate 104, variations in the predetermined distance, and/or variations in an angular orientation of the interface portion 112 and the mold plate 104. The predetermined distance can be, for example, an appropriate value of the dimension X in FIG. 1, for example, about 5 mm in one or mote exemplary embodiments.

In the exemplary embodiment shown in FIG. 1, the dispensing region 112 is formed integrally with the compliant portion 110 and is formed with a plurality of "additional" apertures 114 (that is, there are a plurality of apertures, not merely the "at least one aperture" first mentioned; the apertures are discussed further below). The aforementioned at least one aperture 114 and the plurality of additional apertures 114 are configured and dimensioned as nozzles. Further, in the exemplary embodiment shown in FIG. 1, an outer insulating layer 116 is associated with the dispensing region 112, the nozzles are formed through the insulating layer 116 as well as the dispensing region 112, and the insulating layer 116 reduces heat transfer between the dispensing region 112 and the mold plate 104. The insulating layer may also be formed of any suitable anti-friction material and be used to reduce friction between the dispensing region 112 and the mold plate 104. In the example of FIG. 1, the insulating layer 116 extends over compliant portion 110, but it should be understood that it is intended to reduce heat transfer to the mold 104 and thus can, in one or more embodiments, be limited to the contact area between dispensing region 112 and mold 104.

Figure 2:
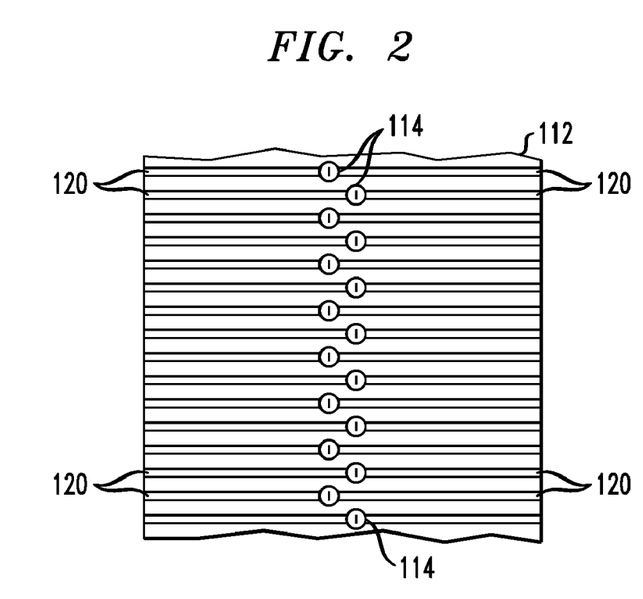
FIGS. 2 and 3 are views of the membrane outer layer of the fill head of FIG. 1, showing micro-channels for cavity venting, and the solder deliver region.
Figure 3:
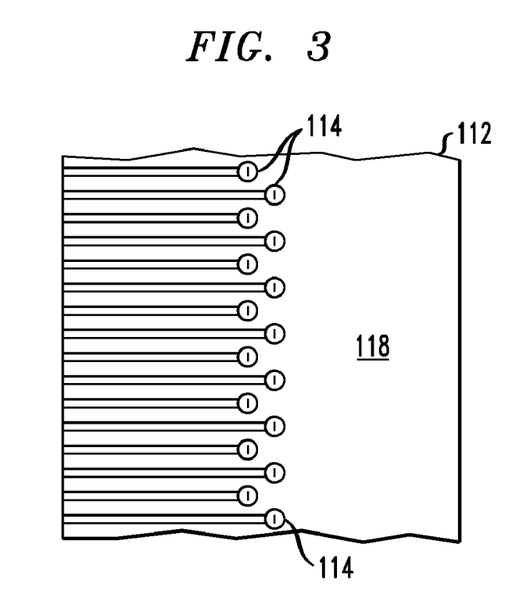
Figure 4:
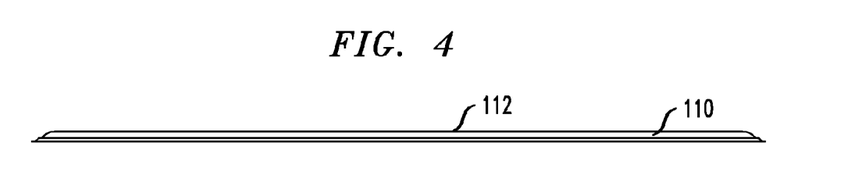
FIGS. 4-7 show several views of a compliant membrane that conforms to the mold plate.
Figure 5:
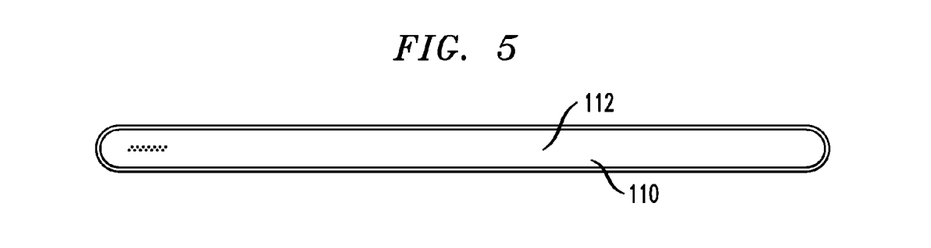
Figure 6:
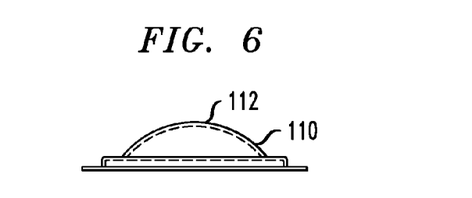
Figure 7:
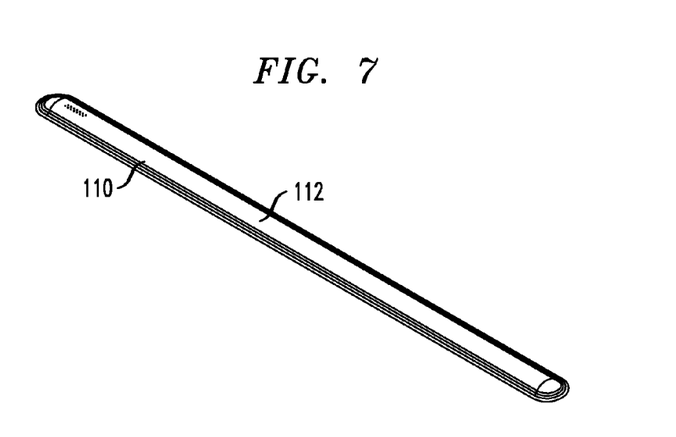

Turning now to FIGS. 2 and 3, which show the bottom of region 112 that faces mold 104, the dispensing region 112 (and the compliant portion 110) can be formed with a plurality of micro-channel vents 120 configured and dimensioned to permit escape of gas trapped in the cavities 102 of the mold plate 104. In particular, gas in cavities 102 flows away through vents 120 when a corresponding aperture 114 interfaces with a given cavity 102. Preferably, the solder apertures 114 are arranged such that they overlap in the vertical direction, so that the entire width of the dispensing region is covered by one or more dispensing apertures; hence no gaps in coverage. Region 118 in FIG. 3 represents a solder solidification zone. The solder solidification zone width is preferably chosen to permit the solder to solidify before exiting the region 118; the width is typically a few millimeters. FIGS. 4-7 are, respectively, side, top, end, and isometric views of a compliant membrane that can be employed as an integral formation of compliant portion 110 and dispensing region 112.

FIGS. 1-7 thus illustrate dispensing of solder into the mold plate micro-cavities 102 through a compliant membrane 110, 112, (and optionally 116). The compliant membrane may be a stainless steel foil (or other metal or molded high temperature polymer material) and it may incorporate an outer insulating material 116, as discussed. The membrane may be patterned with solder delivery nozzles 114 and micro-channel venting structures 120. When the fill head 100 is brought into contact with the mold 104, the fill head compliant membrane 110, 112, (and optionally 116) deforms to ensure proper and uniform contact with the mold surface establishing a contact region of, typically, several millimeters. Variations in mold flatness, solder head height or tilt angle ate taken up by the compliant membrane 110, 112, (and optionally 116). The membrane outer surface micro-channel vents 120 enable the mold cavity gas to escape while the solder is being dispensed into the cavities 102. The compliant membrane portions 110, 112 may be a stamped stainless steel film; the outer layer 116 may be a polymer material that is bonded to the compliant membrane 110, 112. The outer layer 116 serves as an insulator enabling the solder to cool after fill and before it exits the membrane contact region.

Figure 8:
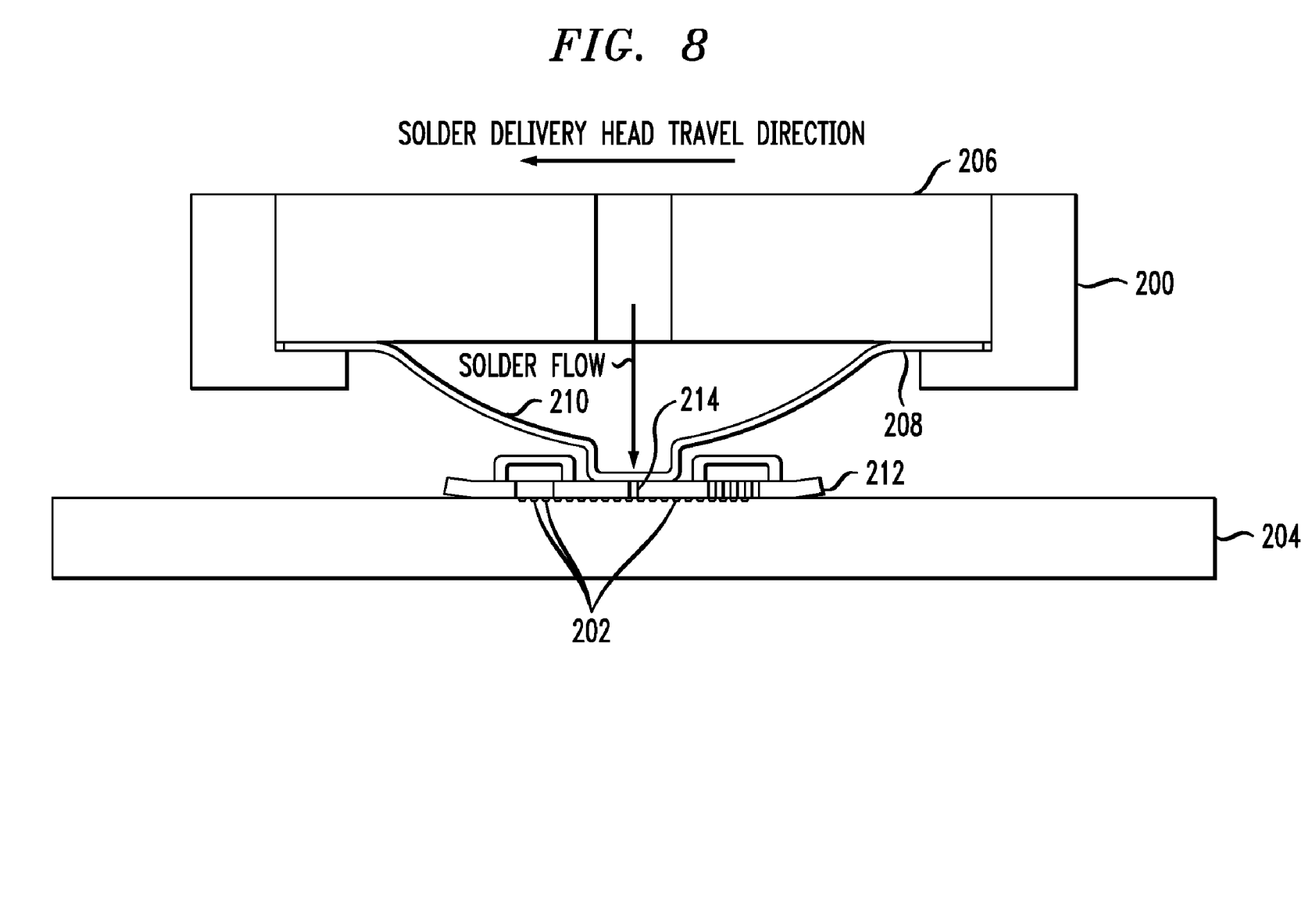
FIG. 8 shows a cross-sectional view of an exemplary embodiment of a solder fill head, according to another aspect of the invention, that incorporates a compliant membrane and a compliant contact plate with vacuum assisted venting, solder delivery, and gas cooling functions.

Attention should now be given to FIG. 8, which depicts an alternative exemplary embodiment of a mold fill head, according to another aspect of the invention. Elements in FIG. 8 similar to those just described with regard to the first exemplary embodiment have received the same reference character, incremented by one hundred, and will not be described again except to the extent that they differ significantly from those already described. In this embodiment, instead of a dispensing region 112 formed integrally with compliant portion 110, as in FIG. 1, the dispensing region is in the form of a compliant contact plate 212 secured to the compliant portion 210. As with the first embodiment, there can be one or more apertures 214, configured and dimensioned as nozzles. The nozzles can be configured and dimensioned to substantially prevent solder leakage, via surface tension, when the dispensing region 212 is disengaged from the mold plate 204 and solder pressure is turned off. That is, the pressure differential due to surface tension at the meniscus of the solder in the aperture 214 is sufficient to retard flow of solder out of the aperture, due to the relatively small radius of the aperture, unless pressure is deliberately applied to the solder within the head 200.

Figure 9:
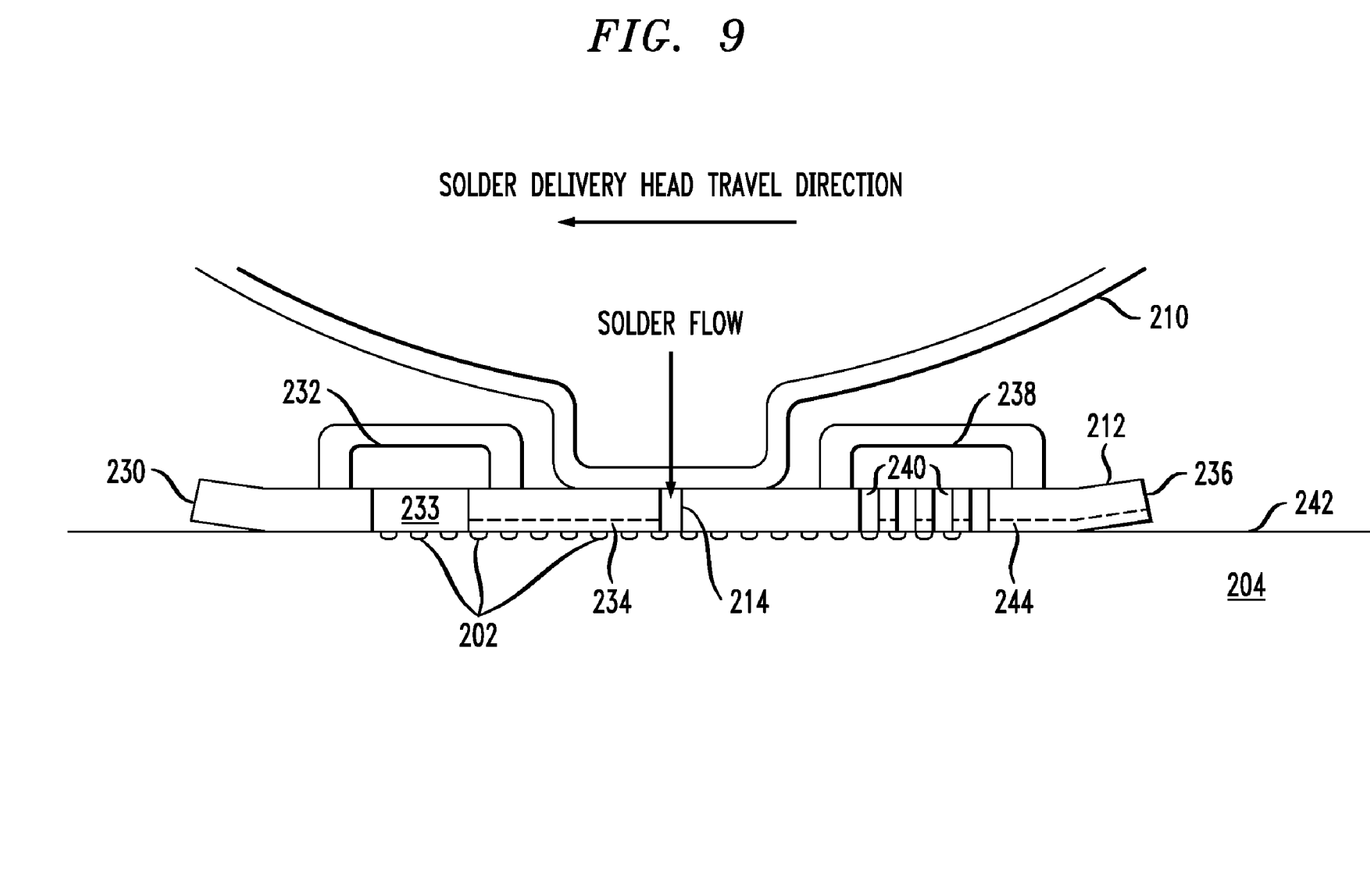
FIG. 9 shows a close up of the compliant contact plate.

FIG. 9 presents an enlarged view of the plate 212 and adjacent items In the exemplary embodiment depicted, the compliant contact plate 212 has a leading edge 230 (defined based on the solder head travel direction as indicated by the allow), and also includes a reduced-pressure chamber 232 located substantially at the leading edge 230. A suitable vacuum (i.e., pressure below ambient) may be applied to chamber 232, which can also be referred to as a vacuum chambers. Typically a vacuum level of −27 inches of mercury or more (about −686 mm Hg or more) is sufficient. "More" in this context means more vacuum, that is, a larger negative number. Further, in the example shown, the compliant plate 212 is formed with a plurality of micro-channel vents 234 in fluid communication with the reduced-pressure chamber 232 through vacuum slot 233, the vents 234 being configured and dimensioned to permit escape of gas trapped in the cavities 202 of the mold plate 204, substantially without passage of solder. That is, the vents 234 are small enough that surface tension and/or viscous effects would substantially or completely prevent solder from flowing into vents 234, yet are large enough to vent gas from cavities 202.

In the example depicted, the compliant contact plate has a trailing edge 236, also defined with respect to the direction of travel of the solder delivery head, as indicated by the arrow, and additionally, a cooling fluid chamber 238 is located substantially at the trailing edge 236. The cooling fluid chamber is preferably a cooling gas chamber (that is, the cooling fluid is preferably a suitable gas) and the compliant plate 236 is optionally formed with a plurality of micro-channel cooling gas vents 240 in fluid communication with the cooling gas chamber 238, the vents being configured and dimensioned to direct cooling gas over a surface 242 of the mold plate 204 In the example of FIG. 9, vents 240 communicate with micro-channels structures 244 (in another approach, discussed below, they communicate with a micro-recess structure).

Other possible features that could be incorporated into the approach of FIG. 8 include an outer insulating layer associated with the dispensing region 212, the at least one aperture 214 being formed through the insulating layer as well as the dispensing region 212 (that is, the complaint contact plate), the insulating layer reducing heat transfer between the dispensing region and the mold plate 204 (again, an anti-friction material could be employed to reduce friction between contacting parts). While not explicitly shown in the figures, the insulating layer could be applied to the surface of plate 212 that touches mold 204, using materials and techniques as described above with regard to the first embodiment. Further, the micro-channel vents 234 could be used without a reduced pressure chamber 232, as with vents 120 of the first embodiment.

Figure 10:
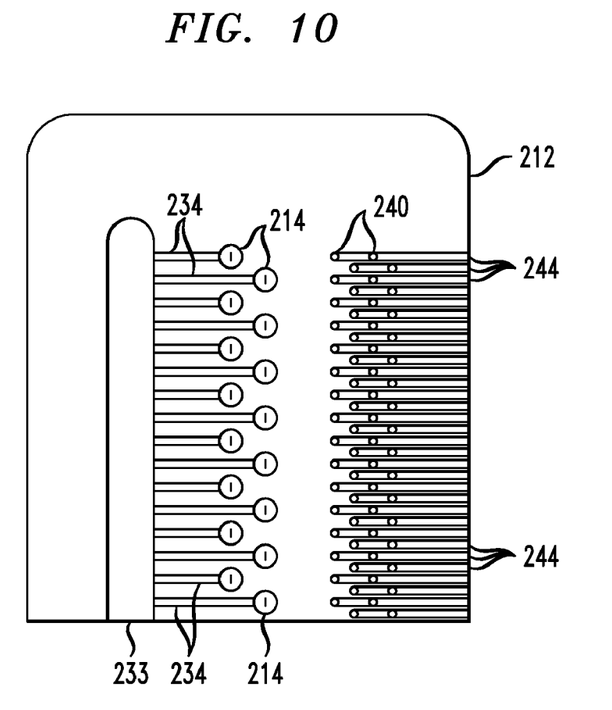
FIGS. 10-16 show bottom (and associated elevation) views of compliant mold plates with integrated vacuum venting, solder delivery, and solder cooling regions.
Figure 11:
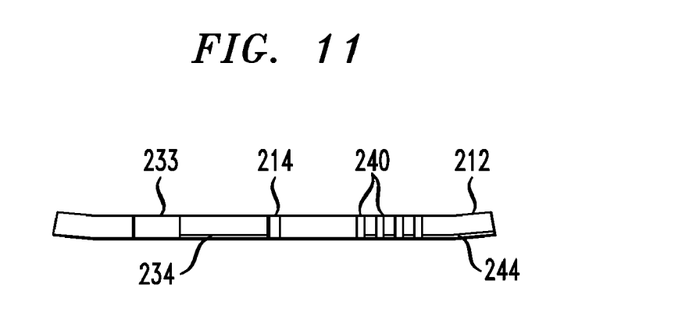

FIG. 10 shows the bottom portion of plate 212 that faces mold 204. FIG. 11 is a corresponding elevation.

Figure 12:
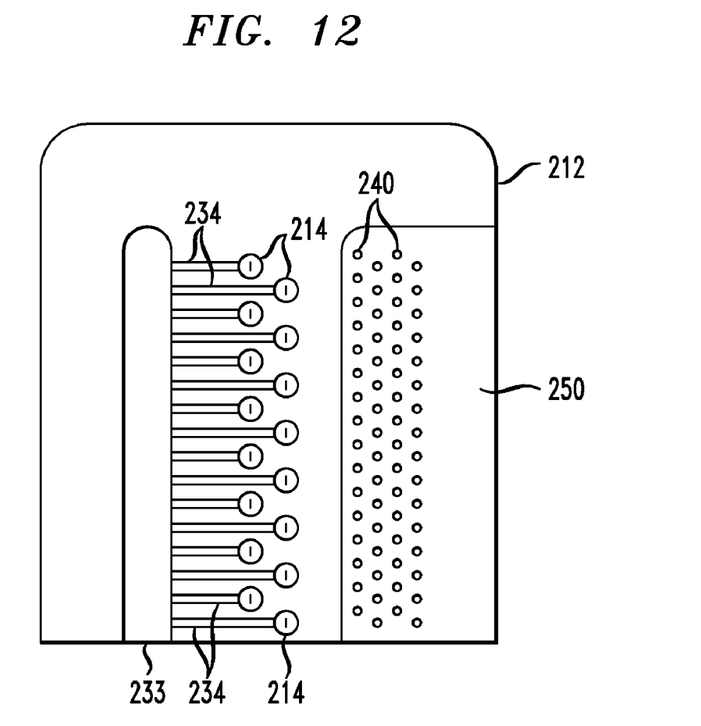
Figure 13:
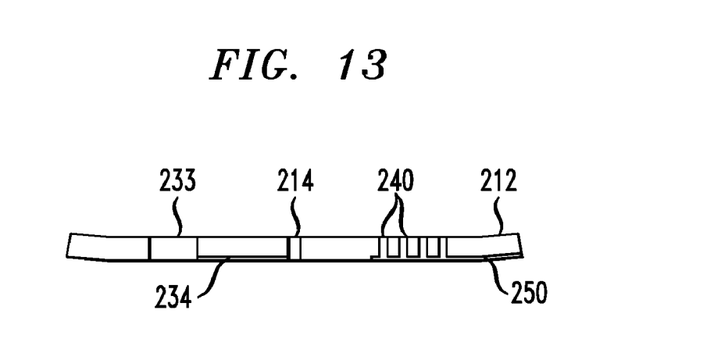

FIG. 12 shows the bottom portion of an alternative embodiment of plate 212. FIG. 13 is a corresponding elevation. In the alternative embodiment, micro-channels structures 244 ate replaced with a micro-recess 250. Typically a recess of about 1-3 microns in depth is appropriate.

Figure 14:
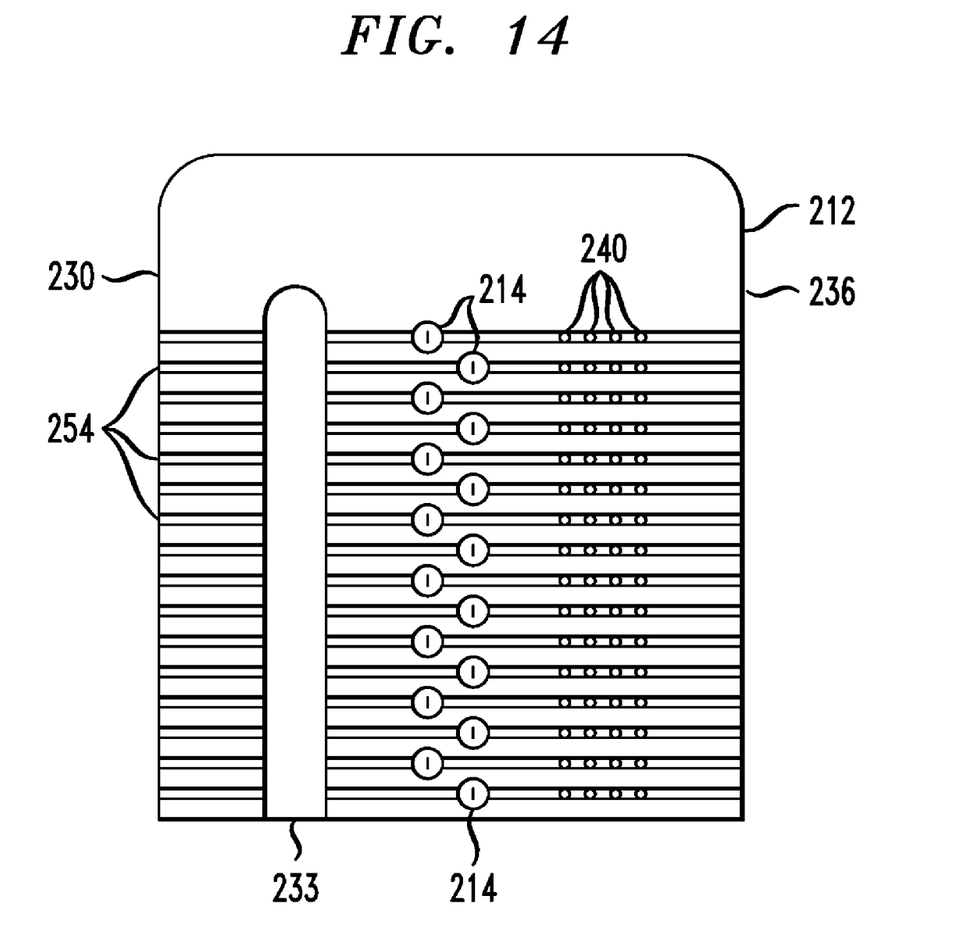

FIG. 14 shows another possible alternative embodiment. Continuous micro-channels 254 extend along the plate 212 from the leading edge 230 to the trailing edge 236, and function as both vent and cooling gas passages.

Figure 15:
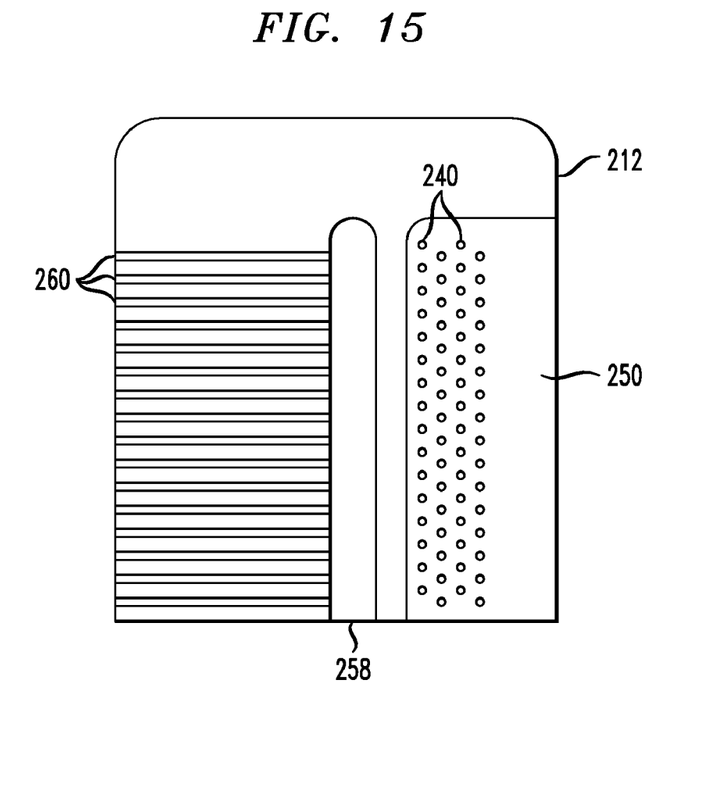
Figure 16:
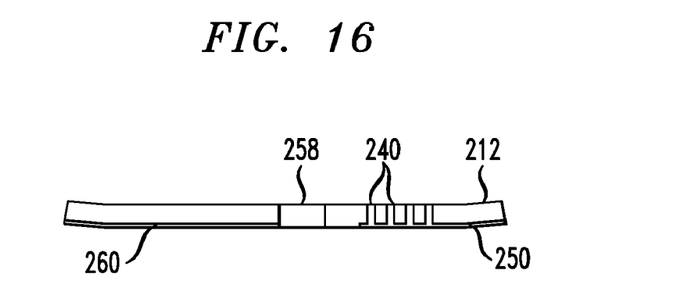

FIG. 15 shows the bottom portion of yet another alternative embodiment of plate 212. FIG. 16 is a corresponding elevation. In this alternative embodiment, the at least one aperture is formed as a continuous slot 258 (also referred to as a solder delivery slot). The slot may be, in one or more exemplary embodiments, a few microns to tens of microns wide, and a few microns deep. In this approach, micro-channel vents 260 are employed without vacuum assist. It should be appreciated that all the embodiments are exemplary in nature, and are not intended to be limiting. Various features in different embodiments can be "mixed and matched" as will be appreciated by the skilled artisan.

Figure 17:
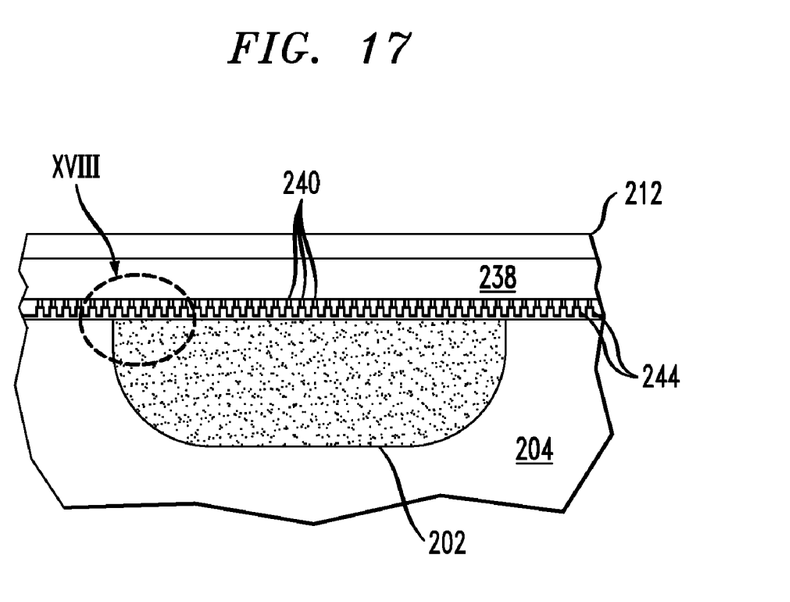
FIGS. 17 and 18 are end views of the compliant contact plate showing the gas cooling channels above a solder filled cavity.
Figure 18:
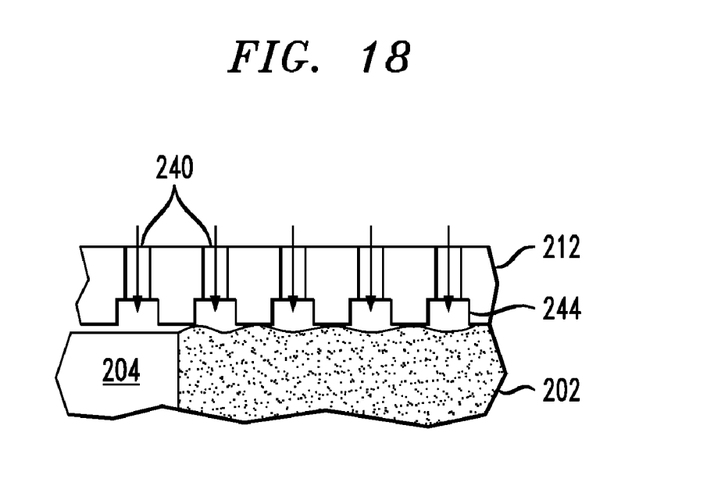

FIG. 17 shows a detailed end (trailing edge) view of the cooling gas structure of plate 212, with solder in cavity 202 of mold 204. Cooling gas flows from chamber 238 of plate 212 through vents 240 and through micro-channels structures 244. FIG. 18 is a close-up of region XVIII in FIG. 17. Cooling gas flow from the chamber 238 (not shown in FIG. 18) is indicated by the downward arrows, through vents 240 and into structures 244. The cooling gas cools the adjacent surface of solder in cavity 202 of mold 204.

By way of review and provision of detail, FIGS. 8 through 18 thus illustrate delivery of solder to the mold plate cavities 202 via a compliant contact plate 212. The contact plate 212 may be mounted on a compliant membrane 210, similar to that described with regard to FIGS. 1-7. The compliant contact plate 212 may incorporate additional functions such as vacuum assisted cavity venting, via elements 232-234. A vacuum slot 233 may be positioned near the leading edge 230 of the contact plate 212. Optional micro-channels 234 may connect the vacuum slot with the solder fill region 214. These micro-channels 234 are preferably sized to allow gas be evacuated from the micro-channels 234 but prevent solder from passing.

The compliant contact plate 212 incorporates a solder delivery region. The solder may be delivered by a series of micro-ports 214, or by a continuous slot 258 in the contact plate 212. The micro-ports 214 enable solder to be dispensed. If the solder pressure is turned off, the head 200 may be lifted from the mold plate 204 without solder leakage due to surface tension of the solder and the small size of the micro-ports 214.

The compliant contact plate 212 may incorporate a gas assisted cooling region, such as elements 238, 240, 244, 250, and trailing-edge portions of 254. After the solder is dispensed into the mold cavities 202, it must solidify before exiting the contact plate 212. Micro-vents 240 may be included in the cooling region to enable a gas to pass over the solder, speeding its solidification.

The compliant contact plate 212 may have an outer layer (a polymer layer) (not shown) that acts as a thermal insulator. In this case, the heat transfer from the compliant contact plate 212 to the mold plate 204 is reduced, allowing the mold plate 204 to assist with the solder solidification.

The invention further contemplates the combination of a mold plate, such as, by way of example and not limitation, 104 or 204, having a plurality of cavities 102, 202 and an inventive mold fill head, such as, by way of example and not limitation, heads 100, 200. Yet further; an inventive method for filling cavities, such as, by way of example and not limitation, cavities 102, 202 in a mold plate, such as, by way of example and not limitation, mold plates 104, 204, includes the steps of providing an inventive mold fill head as described, causing the mold fill head to be substantially a predetermined distance from the mold plate 104, 204 with the at least one aperture 114, 214, 258 in fluid communication with at least one of the cavities 102, 202, and flowing solder from the solder delivery head 100, 200, through the at least one aperture 114, 214, 258, into the at least one of the cavities 102, 202.

The techniques set forth herein can be used to make the solder balls that are attached to an integrated circuit chip. The chip design can be created, for example, in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design can then be converted into an appropriate format such as, for example, Graphic Design System II (GDSII), for the fabrication of photolithographic masks, which typically include multiple copies of the chip design in question that are to be formed on a wafer. The photolithographic masks can be utilized to define areas of the wafer (and/or the layers thereon) to be etched or otherwise processed.

Resulting integrated circuit chips can be distributed by the fabricator in raw wafer form (that is, as a single wafer that has multiple unpackaged chips), as a bare die or in a packaged form. In the latter case, the chip can be mounted in a single chip package (such as a plastic carrier, with leads that are affixed to a mother board or other higher level carrier) or in a multi-chip package (such as a ceramic carrier that has either or both surface interconnections or buried interconnections). In any case, the chip may then be integrated with other chips, discrete circuit elements and/or other signal processing devices as part of either (a) an intermediate product, such as a mother board, or (b) an end product. The end product can be any product that includes integrated circuit chips, ranging from toys and other low-end or consumer electronic applications to advanced computer products. The techniques set for the herein can be used for interconnecting the chip on chips or chip stacks for 3D applications, chips on wafers, chips on package or package on package.

It will be appreciated and should be understood that the exemplary embodiments of the invention described above can be implemented in a number of different fashions. Given the teachings of the invention provided herein, one of ordinary skill in the related art will be able to contemplate other implementations of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A mold fill head for filling cavities in a mold plate, said mold fill head comprising:
   a solder delivery head; and
   an interface portion, said interface portion in turn comprising:
      a compliant portion secured to said solder delivery head, wherein said compliant portion is configured to have a curved shape in an absence of forces from another object; and
      a dispensing region associated with said compliant portion and being formed with at least one aperture configured to interface with the cavities in the mold plate, said at least one aperture being in fluid communication with said solder delivery head;
   wherein said compliant portion is configured and dimensioned to urge said dispensing region against the mold plate when held a predetermined distance therefrom and to substantially tolerate at least one of variations in flatness of the mold plate, variations in the predetermined distance, and variations in an angular orientation of said interface portion and the mold plate.

2. The mold fill head of claim 1, wherein said dispensing region is formed integrally with said compliant portion and is formed with a plurality of additional apertures, said at least one aperture and said plurality of additional apertures being configured and dimensioned as nozzles.

3. The mold fill head of claim 2, wherein said dispensing region and said compliant portion are formed with a plurality of micro-channel vents configured and dimensioned to permit escape of gas trapped in the cavities of the mold plate.

4. The mold fill head of claim 3, further comprising an outer insulating layer associated with said dispensing region, said nozzles being formed through said insulating layer as well as said dispensing region, said insulating layer reducing heat transfer between said dispensing region and the mold plate.

5. The mold fill head of claim 4, wherein said insulating layer is further configured to reduce friction between said dispensing region and the mold plate.

6. The mold fill head of claim 1, wherein said dispensing region comprises a compliant contact plate secured to said compliant portion.

7. The mold fill head of claim 6, wherein said dispensing region is formed with a plurality of additional apertures, said at least one aperture and said plurality of additional apertures being configured and dimensioned as nozzles.

8. The mold fill head of claim 7, wherein said nozzles are configured and dimensioned to substantially prevent solder leakage, via surface tension, when said dispensing region is disengaged from the mold plate and solder pressure is turned off.

9. The mold fill head of claim 6, wherein said at least one aperture is formed as a continuous slot.

10. The mold fill head of claim 6, wherein said compliant plate is formed with a plurality of micro-channel vents configured and dimensioned to permit escape of gas trapped in the cavities of the mold plate.

11. The mold fill head of claim 6, wherein said compliant contact plate has a leading edge, further comprising a reduced-pressure chamber located substantially at said leading edge.

12. The mold fill head of claim 11, wherein said compliant plate is formed with a plurality of micro-channel vents in fluid communication with said reduced-pressure chamber, said vents being configured and dimensioned to permit escape of gas trapped in the cavities of the mold plate, substantially without passage of solder.

13. The mold fill head of claim 6, wherein said compliant contact plate has a trailing eke, further comprising a cooling fluid chamber located substantially at said trailing edge.

14. The mold fill head of claim 13, wherein said cooling fluid chamber comprises a cooling gas chamber and wherein said compliant plate is formed with a plurality of cooling gas vents in fluid communication with said cooling gas chamber, said vents being configured and dimensioned to direct cooling gas over a surface of the mold plate.

15. The mold fill head of claim 6, further comprising an outer insulating layer associated with said dispensing region, said at least one aperture being formed through said insulating layer as well as said dispensing region, said insulating layer reducing heat transfer between said dispensing region and the mold plate.

16. The mold fill head of claim 15, wherein said insulating layer is further configured to reduce friction between said dispensing region and the mold plate.

17. A system comprising:
a mold plate having a plurality of cavities; and
a mold fill head for filling said cavities in said mold plate, said mold fill head in turn comprising:
a solder delivery head; and
an interface portion, said interface portion in turn comprising:
a compliant portion secured to said solder delivery head, wherein said compliant portion is configured to have a curved shape in an absence of forces from another object; and
a dispensing region associated with said compliant portion and being formed with at least one aperture configured to interface with said cavities in said mold plate, said at least one aperture being in fluid communication with said solder delivery head;
wherein said compliant portion is configured and dimensioned to urge said dispensing region against said mold plate when held a predetermined distance therefrom and to substantially tolerate at least one of variations in flatness of said mold plate, variations in said predetermined distance, and variations in an angular orientation of said interface portion and said mold plate.

18. The combination of claim 17, wherein said dispensing region is formed integrally with said compliant portion and is formed with a plurality of additional apertures, said at least one aperture and said plurality of additional apertures being configured and dimensioned as nozzles.

19. The combination of claim 17, wherein said dispensing region comprises a compliant contact plate secured to said compliant portion.

20. (Currently Amended A method for filling cavities in a mold plate, said method comprising the steps of:
providing a mold fill head for filling said cavities in said mold plate, said mold fill head in turn comprising:
a solder delivery head; and
an interface portion, said interface portion in turn comprising:
a compliant portion secured to said solder delivery head, wherein said compliant portion is configured to have a curved shape in an absence of forces from another object; and
a dispensing region associated with said compliant portion and being formed with at least one aperture configured to interface with said cavities in said mold plate, said at least one aperture being in fluid communication with said solder delivery head;
wherein said compliant portion is configured and dimensioned to urge said dispensing region against said mold plate when held a predetermined distance therefrom and to substantially tolerate at least one of variations in flatness of said mold plate, variations in said predetermined distance, and variations in an angular orientation of said interface portion and said mold plate;
causing said mold fill head to he substantially said predetermined distance from said mold plate with said at least one aperture in fluid communication with at least one of said cavities; and
flowing solder from said solder delivery head, through said at least one aperture, into said at least one of said cavities.

21. The method of claim 20, wherein in said providing step, said dispensing region is formed integrally with said compliant portion and is formed with a plurality of additional apertures, said at least one aperture and said plurality of additional apertures being configured and dimensioned as nozzles.

22. The method of claim 20, wherein in said providing step, said dispensing region comprises a compliant contact plate secured to said compliant portion.

* * * * *